(12) United States Patent
Debras et al.

(10) Patent No.: US 9,012,534 B2
(45) Date of Patent: *Apr. 21, 2015

(54) COMPOSITES OF POLY(HYDROXY CARBOXYLIC ACID) AND CARBON NANOTUBES

(71) Applicant: Total Research & Technology Feluy, Seneffe (Feluy) (BE)

(72) Inventors: Guy Debras, Frasnes-lez-Gosselies (BE); Romain Luijkx, Chercq (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,612

(22) Filed: Apr. 28, 2014

(65) Prior Publication Data

US 2014/0231699 A1 Aug. 21, 2014

Related U.S. Application Data

(63) Continuation of application No. 12/674,704, filed as application No. PCT/EP2008/061058 on Aug. 25, 2008.

(30) Foreign Application Priority Data

Aug. 24, 2007 (EP) .................... 07114921

(51) Int. Cl.
*B82Y 30/00* (2011.01)
*C08J 3/22* (2006.01)
*C08K 3/04* (2006.01)
*C08L 23/02* (2006.01)
*C08L 67/04* (2006.01)
*H01B 1/24* (2006.01)
*C08J 5/00* (2006.01)
*C09K 5/14* (2006.01)
*C08K 7/24* (2006.01)
*C08L 23/10* (2006.01)
*H01B 3/44* (2006.01)

(52) U.S. Cl.
CPC . *C09K 5/14* (2013.01); *B82Y 30/00* (2013.01); *C08J 3/226* (2013.01); *C08J 5/005* (2013.01); *C08J 2323/02* (2013.01); *C08J 2367/04* (2013.01); *C08J 2467/00* (2013.01); *C08K 7/24* (2013.01); *C08K 2201/011* (2013.01); *C08L 23/02* (2013.01); *C08L 23/10* (2013.01); *C08L 67/04* (2013.01); *C08L 2314/06* (2013.01); *H01B 1/24* (2013.01); *H01B 3/441* (2013.01); *Y10S 977/742* (2013.01)

(58) Field of Classification Search
USPC .................. 523/218; 524/496, 502; 252/511; 977/742
See application file for complete search history.

(56) References Cited

U.S. PATENT DOCUMENTS

2008/0033097 A1* 2/2008 Hayata et al. ................ 524/496

FOREIGN PATENT DOCUMENTS

JP 2006104335 A * 4/2006

OTHER PUBLICATIONS

McCullen et al. (J. Appl. Polym. Sci., vol. 105, p. 1668-1678, 2007—published online Apr. 25, 2007).*

* cited by examiner

Primary Examiner — Ling Choi
Assistant Examiner — Ronald Grinsted

(57) ABSTRACT

A resin composition comprising a polyolefin, carbon nanotubes and poly(hydroxy carboxylic acid). The invention also covers a process for preparing a resin composition comprising a polyolefin, carbon nanotubes and poly(hydroxy carboxylic acid) by (i) blending a poly(hydroxy carboxylic acid) with carbon nanotubes to form a composite (ii) blending the composite with a polyolefin. The use of poly(hydroxy carboxylic acids) as a compatibilizer to blend carbon nanotubes into polyolefins is also claimed.

14 Claims, No Drawings

COMPOSITES OF POLY(HYDROXY CARBOXYLIC ACID) AND CARBON NANOTUBES

CROSS-REFERENCE TO RELATED APPLICATIONS

This application is a Continuation of U.S. application Ser. No. 12/674,704, filed on Feb. 23, 2010, which claims the benefit of PCT/EP2008/061058, filed on Aug. 25, 2008, which claims priority from EP 07114921.5, filed on Aug. 24, 2007.

TECHNICAL FIELD OF THE INVENTION

The present invention is concerned with obtaining polyolefin compositions containing nanotubes.

BACKGROUND OF THE INVENTION

It has been known for many years that blending fibres into polymers can significantly improve the mechanical properties of the polymers in question. Long fibres made of materials such as metal, glass or asbestos (GB 1179569 A) have been used to this effect. Boron, silicon carbide and even carbon fibres have been developed for this purpose. The initially developed carbon fibres had diameters of several tens of microns and lengths in the order of millimeters. They were quite light and despite this had impressive mechanical properties, displaying Young's moduli in the range of 230 to 725 GPa and strengths in the range of 1.5 to 4.8 GPa. Carbon fibres, also known as carbon nanofibres, having higher aspect ratios, have also been prepared having even smaller diameters of about 100 nm and lengths up to 100 microns, Young's moduli in the range of 100 to 1000 GPa and strengths in the range of 2.5 to 3.5 GPa.

However, the most recent development, resulting from the discovery of Buckminsterfullerene (C60), is the carbon nanotube having unprecedented physical and chemical properties. A single wall carbon nanotube (SWNT) is a one-atom thick sheet of graphite (called graphene) rolled up into a seamless hollow cylinder which can have a diameter of the order of 1 nm and lengths of up to several millimeters. The aspect ratio can thus potentially reach values of several millions. Multi-walled carbon nanotubes (MWNT) have also been developed, which are concentric arrays of single-walled carbon nanotubes (also known as the Russian Doll model).

With Young moduli of up to 5 TPa and mechanical strengths even greater than 70 GPa, carbon nanotubes have great potential to replace conventional carbon fibres as polymer reinforcements.

Carbon nanotubes are also extremely light and have unique thermal and electronic properties. Depending on how the graphene sheet is rolled i.e. the relationship between the axial direction and the unit vectors describing the hexagonal lattice, and depending on the diameter, on the number of walls and on the helicity, the nanotube can be designed to be conducting or semi-conducting. Carbon nanotubes of high purity are extremely conductive. In theory, pristine carbon nanotubes should be able to have an electrical current density of more than 1,000 times greater than metals such as silver and copper. This is because no scattering of charge occurs as it travels through the tube, resulting in what is known as ballistic transport of the charge. Nanotubes may thus be added to an electrically insulating polymer to produce conductive plastics with exceedingly low percolation thresholds as described in WO 97/15934.

As for thermal properties, carbon nanotubes are also very conductive for phonons. Previous calculatations predict that at room temperature, thermal conductivity of up to 6000 W/m K can be achieved with pure nanotubes, which is roughly twice as much as pure diamond. Nanotubes dispersed within a polymer matrix can thus provide thermally conductive resin compositions.

Carbon nanotubes have also been cited as having flame retardant properties. Nanotubes dispersed within a polymer matrix can thus provide materials with fire proof properties.

Due to all of these properties, carbon nanotubes have been envisaged for use in many applications in recent years (see P. Calvert "Potential application of nanotubes" in Carbon Nanotubes, Editor T. W. Ebbeson, 297, CRC, Boca Raton, Fla. 1997; T. W. Ebbeson, "Carbon Nanotubes", Annu. Rev. Mater. Sci., 24, 235, 1994; Robert F. Service, "Super strong nanotubes show they are smart too", Science, 281, 940, 1998: and B. I. Yakobson and R. E. Smalley, "Une technologie pour le troisième millénaire: les nanotubes", La Recherche, 307, 50, 1998). However, currently the most promising line of research involves the mechanical enhancement of polymers by using carbon nanotubes as reinforcing fillers.

Overall, it can be considered that there are four main requirements for the carbon nanotubes to effectively reinforce the polymer and to increase its conductivity and flame retardation properties: good dispersion of the nanotubes in the polymer matrix, large aspect ratio of the nanotubes, efficient transfer of interfacial stress and alignment (Coleman et al., Carbon, 44, 2006, pp 1624-1652). Good dispersion can be considered to be the most important factor. The blends of carbon nanotubes and polymer must be homogeneous i.e. the nanotubes must be uniformly dispersed with the effect that each nanotube is individually coated with the polymer so that efficient load transfer to the nanotube network can be achieved. Lack of homogeneity introduces stress concentration centres i.e. weak points where there is, for instance, a relatively low concentration of nanotubes and a high concentration of polymer. Non-homogeneous nanotube-polymer composites therefore result in only slight improvements in mechanical strength and little or no improvement of electrical conductivity.

One of the current areas of research is the carbon nanotube reinforcement of thermoplastic polymers, in particular of commodity plastics such as polyolefins. However, as of yet melt processed blends of polyolefins and carbon nanotubes have not produced the desired results. Dispersion of the nanotubes in the polyolefin matrix using conventional techniques is poor due to the presence of Van der Waals interactions that favour the formation of carbon nanotube agglomerates. Other methods for blending, such as solution processing, surfactant-assisted processing, solution-evaporation methods with high-energy sonication and the like, which break up, to an extent, the agglomerates, have provided slightly better results. However, these are time-, energy- and money-consuming processes. There is thus a need to improve the results from melt processing, as it is the most preferred industrial method for blending due to its speed, simplicity and compatibility with standard industrial equipment. As a result of poor dispersion from melt processing, the mechanical strengths and Young's moduli of the nanotube-polyolefin composites are not increased to the extent expected and in certain cases are even decreased. Electrical conductivity of the resulting non-homogeneous composite is also lower than expected. Those procedures reported as providing homogeneous nanotube-polyolefin composites are often misleading, since in these aggressive blending methods, the nanotubes are forced to break, thereby lowering the aspect ratio and limiting the potential increase in stiffness, strength and conductivity of the composite. Aggressive blending can also result in the damaging of the surface of the carbon nanotubes, which also lowers stability and conductivity of the composite.

Tang et al. Carbon, 41, 2003, 2779-2785 report a MWNT/ HDPE composite, which was compounded using a twin-screw extruder after preliminary melt-mixing. From the figures in the relevant article it is seen that while there are some individual nanotubes scattered in the matrix, most of them are clumped together forming large aggregates. An attempt was made to co-feed the MWNTs directly into the extruder, but this technique had to be abandoned as the MWNTs had a tendency to stick to the hopper walls. Overall mechanical properties improved, but not to the extent that would be expected of carbon nanotubes. This is probably due to the problems mentioned above regarding reduced aspect ratios and damaged surfaces resulting from aggressive blending methods.

Lopez Manchado et al. Carbon 43, 2005, 1499-1505 reported a melt compounded polypropylene and carbon nanotube composite. Low concentrations of nanotubes less than 1 wt % showed some improvement in mechanical properties. However, large aggregates of nanotubes were already observed when only 1 wt % of carbon nanotubes was present, at which point stiffness and strength of the composite decreased.

EP 1 181 331 also discloses composites of carbon nanotubes and polyolefins, whereby the mixture is stretched both in the molten state and in the solidified state to increase alignment of the carbon nanotubes and thereby induce higher mechanical strengths in the composite therefrom. However, while stretching blends to orientate the carbon nanotubes is a method suitable for fibre applications and to maximize the mechanical properties of fibres, this may not be the case for other applications. Aligned composites have an-isotropic mechanical properties that may need to be prevented in bulk samples.

EP 1 349 179 discloses partly purified carbon nanotubes i.e. carbon nanotubes that have not been partially oxidized during a purification step. It is shown that these nanotubes have a better dispersion in apolar polymers such as polyolefins. Oxidised nanotubes have altered polarities and hence a reduced affinity to apolar polymers, such as polypropylene and polyethylene. However, in the figures one can still see the agglomerates of nanotubes in the nanoscale. There is thus a need to induce dispersion of nanotubes in the nanoscale in polyolefins.

Another method of enhancing miscibility of carbon nanotubes with polyolefins has been by functionalizing the carbon nanotubes and/or the polyolefins. Functionalisation is described in J. Chen et al., Science, 282, 95-98, 1998; Y. Chen et al., J. Mater. Res., 13, 2423-2431, 1998; M. A. Hamon et al., Adv. Mater., 11, 834-840, 1999; A. Hiroki et al., J. Phys. Chem. B, 103, 8116-8121, 1999. The functionalisation can be carried out, for instance, by reaction with an alkylamine. It results in a better separation of the nanotubes in the polypropylene matrix thereby favouring the dispersion in the polymer matrix. If the functionalisation is carried out in both the nanotubes and the polymer matrix it promotes their covalent bonding, thereby improving the electrical and mechanical properties of the filled compound. However, functionalisation requires a further reaction step, possibly even a further second step, if the polymer is to be functionalised too. This makes the overall process complicated and costly and in general unsuitable for large-scale industrial production. Furthermore, functionalisation can change the physical properties of the nanotubes, reducing their mechanical strength and electrical conductivity.

It is hence an object of the invention to produce carbon nanotube-poly(hydroxy carboxylic acid) composites that are highly homogeneous.

It is therefore also an aim of the invention to enhance the dispersion of nanotubes in polyolefins in the nanoscale.

Furthermore, it is an aim of the invention to obtain a homogeneous nanotube-poly(hydroxy carboxylic acid) composite by melt processing.

Additionally, it is an aim of the invention to blend the carbon nanotubes with the polyolefin without requiring a functionalisation or modification step respectively.

It is also an object of the invention to provide a resin with better mechanical properties than polyolefins.

It is further an object of the invention to render electrically insulating compositions comprising polyolefins more electrically conductive using carbon nanotubes.

Yet another aim of the invention is to increase the thermal conductivity of polyolefins with the effective dispersion of carbon nanotubes therein.

SUMMARY OF THE INVENTION

At least one of the objectives of the invention were met by providing a resin composition comprising a polyolefin, poly(hydroxy carboxylic acid) and nanotubes.

The invention also provides a process for preparing said resin composition by
i. blending a poly(hydroxy carboxylic acid) with nanotubes to form a nanocomposite
ii. blending the nanocomposite with a polyolefin.

The invention also covers a process for preparing a nanocompound-containing masterbatch by melt blending a poly(hydroxy carboxylic acid) with carbon nanotubes to form a composite.

Use of poly(hydroxy carboxylic acid) as a compatibiliser to blend nanotubes into polyolefins is also claimed.

DESCRIPTION OF THE INVENTION

Upon blending a poly(hydroxy carboxylic acid) with polyolefins, in particular metallocene-catalysed polyolefins, the Applicant noted that homogeneous blends could be achieved via simple melt blending without the need of compatibilisers.

It was also noted that composites of carbon nanotubes and poly(hydroxy carboxylic acid)s were also homogeneous, with well-dispersed carbon nanotubes in the poly(hydroxy carboxylic acid) matrix.

The invention thus makes use of the compatibility of poly(hydroxy carboxylic acid)s with nanotubes and of the surprising compatibility of poly(hydroxy carboxylic acid)s with polyolefins, in particular metallocene polyolefins.

First, a carbon nanotube-poly(hydroxy carboxylic acid) composite is prepared, which is to be used as a masterbatch for blending with the polyolefin.

Carbon Nanotubes

As mentioned above, carbon nanotubes are used for reinforcement of polyolefins in the present invention. By carbon nanotubes it is meant carbon-based tubes having a lattice structure related to the structure of Buckminsterfullerene ($C_{60}$). The nanotubes used in the composition can be SWNT i.e. a one-atom thick sheet of graphite (called graphene) rolled up into a seamless hollow cylinder. MWNT can also be used, which are concentric arrays of single-walled carbon nanotubes. Although termed carbon nanotubes because of their diminutive dimensions, the carbon nanotubes used in the present invention need not necessarily have dimensions of the order of nanometers in size. The dimensions of the nanotubes can be much greater than this.

The diameter of the SWNT is preferably at most 50 nm, 25 nm, 20 nm, 18 nm, 16 nm, 14 nm, 12 nm or 10 nm and at least 0.5 nm, 1 nm, 2 nm, 4 nm. Preferably the diameter of the SWNT is around 1 to 10 nm. The length of a SWNT can be up to 5 cm, 2.5 cm or 1 cm and at least 1 µm, 10 µm or 100 µm. Preferably the length of the SWNT is about 10 µm.

Multi walled carbon nanotubes (MWNT) can also be used according to the invention. The diameter of the MWNT is preferably at most 100 nm, 75 nm, 50 nm, 25 nm, 20 nm, 15 nm or 10 nm and at least 2 nm, 5 nm, 7 nm, 10 nm. Preferably the diameter of the MWNT is 10 to 50 nm. The length of a MWNT can be up to 100 µm, 75 µm, 50 µm and at least 1 µm, 10 µm or 25 µm. Preferably the length of the nanotube is about 10 to 50 µm.

To be used as effective reinforcement fillers, it is preferred that the nanotubes are endowed with a high aspect ratio, having a length/diameter (L/D) of 100 or more, preferably $10^3$ or more and most preferably $10^4$ or more. Increasing the aspect ratio of the nanotubes (at constant nanotube volume fraction and orientation) leads to enhanced strength and stiffness of the composite.

Carbon nanotubes can be produced by any method known in the art. They can be produced by the catalyst decomposition of hydrocarbons, a technique that is called Catalytic Carbon Vapour Deposition (CCVD). This method produces both SWNT and MWNT: the by-products are soot and encapsulated metal(s) nanoparticles. Other methods for producing carbon nanotubes include the arc-discharge method, the plasma decomposition of hydrocarbons or the pyrolysis of selected polymer under selected oxidative conditions. The starting hydrocarbons can be acetylene, ethylene, butane, propane, ethane, methane or any other gaseous or volatile carbon-containing compound. The catalyst, if present, is either pure or dispersed on a support. The presence of a support greatly improves the selectivity of the catalysts but it contaminates the carbon nanotubes with support particles, in addition to the soot and amorphous carbon produced during pyrolysis. Purification can remove these by-products and impurities. This can be carried out according to the following two steps:

1) the dissolution of the support particles, typically carried out with an appropriate agent that depends upon the nature of the support and
2) the removal of the pyrolytic carbon component, typically based on either oxidation or reduction processes.

The term "carbon nanotubes" also includes the use of "functionalised" carbon nanotubes, as well as non-functionalised carbon nanotubes. The surface composition of the nanotubes can be modified in order to improve their dispersion in the polymer matrix and their linking properties: "functionalising" nanotubes is described for example in J. Chen et al., Science, 282, 95-98, 1998; Y. Chen et al., J. Mater. Res., 13, 2423-2431, 1998; M. A. Hamon et al., Adv. Mater., 11, 834-840, 1999; A. Hiroki et al., J. Phys. Chem. B, 103, 8116-8121, 1999. The functionalisation can be carried out by reacting the carbon nanotubes, for example, with an alkylamine. It results in a better separation of the nanotubes in the polymer matrix thereby facilitating uniform dispersion within the polymer matrix. If the functionalisation is carried out on both the nanotubes and the polymer, it promotes their covalent bonding and miscibility, thereby improving the electrical and mechanical properties of the filled compound.

It should be noted that the use in the present invention of effectively non-continuous nanotubes (short in comparison to regular carbon fibres) rather than continuous fibres, allows access to standard processing techniques as used for thermoplastics. These techniques permit high throughput production and fabrication of high quality, complex shaped composites. Thus polymer composites comprising nanotubes can provide the best of both worlds: high mechanical strength and ease of processing.

The Poly(Hydroxy Carboxylic Acid)

The poly(hydroxy carboxylic acid) can be any polymer wherein the monomers are derived from renewable resources and comprise at least one hydroxyl group and at least carboxyl group. The hydroxy carboxylic acid monomer is preferably obtained from renewable resources such as corn and rice or other sugar- or starch-producing plants. Preferably the poly(hydroxy carboxylic acid) used according to the invention is biodegradable. The term "poly(hydroxy carboxylic acid)" includes homo- and copolymers herein.

The poly(hydroxy carboxylic acid) can be represented as in Formula I:

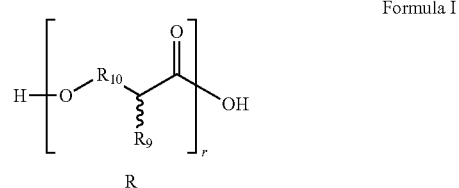

Formula I wherein
R9 is hydrogen or a branched or linear alkyl comprising from 1 to 12 carbon atoms;
R10 is optional and can be a branched, cyclic or linear alkylene chains comprising from 1 to 12 carbon atoms; and
"r" represents the number of repeating units of R and is any integer from 30 to 15000.

The monomeric repeating unit is not particularly limited, as long as it is aliphatic and has a hydroxyl residue and a carboxyl residue. Examples of possible monomers include lactic acid, glycolic acid, 3-hydroxybutyric acid, 4-hydroxybutyric acid, 4-hydroxyvaleric acid, 5-hydroxyvaleric acid, 6-hydroxycaproic acid and the like.

The monomeric repeating unit may also be derived from a cyclic monomer or cyclic dimer of the respective aliphatic hydroxycarboxylic acid. Examples of these include lactide, glycolide, β-propiolactone, β-butyrlactone, γ-butyrolactone, γ-valerolactone, δ-valerolactone, ε-caprolactone and the like.

In the case of asymmetric carbon atoms within the hydroxy carboxylic acid unit, each of the D-form and the L-form as well as mixtures of both may be used. Racemic mixtures can also be used.

The term "poly(hydroxy carboxylic acid)" also includes blends of more than one poly(hydroxy carboxylic acid).

The poly(hydroxy carboxylic acid) may optionally comprise one or more comonomers.

The comonomer can be a second different hydroxycarboxylic acid as defined above in Formula I. The weight percentage of each hydroxycarboxylic acid is not particularly limited.

The comonomer can also comprise dibasic carboxylic acids and dihydric alcohols. These react together to form aliphatic esters, oligoesters or polyesters as shown in Formula II having a free hydroxyl end group and a free carboxylic acid end group, capable of reacting with hydroxy carboxylic acids, such as lactic acid and polymers thereof.

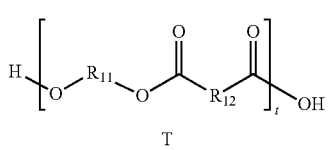

Formula II wherein
R11 and R12 are branched or linear alkylenes comprising from 1 to 12 carbon atoms and can be the same or different;
"t" represents the number of repeating units T These copolymers are also within the scope of the invention. The sum of the number of repeating units "r" (Formula I) and "t" (Formula II) is any integer from 30 to 15000. The weight percentages of each monomer i.e. the hydroxycarboxylic acid monomer and the aliphatic ester or polyester comonomer of Formula II are not particularly limited. Preferably, the poly(hydroxy carboxylic acid) comprises at least 50 wt % of hydroxycarboxylic acid monomers and at most 50 wt % of aliphatic ester, oligoester or polyester comonomers.

The dihydric alcohols and the dibasic acids that can be used in the aliphatic polyester unit as shown in Formula II are not particularly limited. Examples of possible dihydric alcohols include ethylene glycol, diethylene glycol, triethyleneglycol, propylene glycol, dipropylene glycol, 1,3-butanediol, 1,4-butanediol, 3-methyl-1,5-pentanediol, 1,6-hexanediol, 1,7-octanediol, 1,9-nonanediol, neopentyl glycol, 1,4-cyclohexanediol, isosorbide and 1,4-cyclohexane dimethanol and mixtures thereof.

Aliphatic dibasic acids include succinic acid, oxalic acid, malonic acid, glutaric acid, adipic acid, pimelic acid, suberic acid, azelaic acid, sebacic acid; undecanoic diacid, dodecanic diacid and 3,3-dimethylpentanoic diacid, cyclic dicarboxylic acids such as cyclohexanedicarboxylic acid and mixtures thereof. The dibasic acid residue in the hydroxy carboxylic acid copolymer can also be derived from the equivalent diacylchlorides or diesters of the aliphatic dibasic acids.

In the case of asymmetric carbon atoms within the dihydric alcohol or the dibasic acid, each of the D-form and the L-form as well as mixtures of both may be used. Racemic mixtures can also be used.

The copolymer can be an alternating, periodic, random, statistical or block copolymer.

Polymerisation can be carried out according to any method known in the art for polymerising hydroxy carboxylic acids. Polymerisation of hydroxy carboxylic acids and their cyclic dimmers is carried out by polycondensation or ring-opening polymerisation.

Copolymerisation of hydroxycarboxylic acids can be carried out according to any method known in the art. The hydroxycarboxylic acid can be polymerised separately prior to copolymerisation with the comonomer or both can be polymerised simultaneously.

In general, the poly(hydroxy carboxylic acid), homo- or copolymer (copolymerised with a second different hydroxy carboxylic acid or with an aliphatic ester or polyester as described above), may also comprise branching agents. These poly(hydroxy carboxylic acid)s can have a branched, star or three-dimensional network structure. The branching agent is not limited so long as it comprises at least three hydroxyl groups and/or at least three carboxyl groups. The branching agent can be added during polymerisation. Examples include polymers such as polysaccharides, in particular cellulose, starch, amylopectin, dextrin, dextran, glycogen, pectin, chitin, chitosan and derivates thereof. Other examples include aliphatic polyhydric alcohols such as glycerine, pentaerythritol, dipentaerythritol, trimethylolethane, trimethylolpropane, xylitol, inositol and the like. Yet another example of a branching agent is an aliphatic polybasic acid. Such acids include cyclohexanehexacarboxylic acid, butane-1,2,3,4-tetracarboxylic acid, 1,3,5-pentane-tricarboxylic acid, 1,1,2-ethanetricarboxylic acid and the like.

The total molecular weight of the poly(hydroxy carboxylic acid) depends on the desired mechanical and thermal properties and mouldability of the nanotube composite and of the final resin composition. It is preferably from 5,000 to 1,000,000 g/mol, more preferably from 10,000 to 500,000 g/mol and even more preferably from 35,000 to 200,000 g/mol. Most preferably the total molecular weight of the polymer is from 40,000 to 100,000 g/mol.

The molecular weight distribution is generally monomodal. However, in the case of mixtures of two or more fractions of poly(hydroxy carboxylic acid)s of different weight average molecular weight and/or of different type, the molecular weight distribution can also be multimodal e.g. bi- or trimodal.

From a standpoint of availability and transparency, the poly(hydroxy carboxylic acid) is preferably a polylactic acid (PLA). Preferably the polylactic acid is a homopolymer obtained either directly from lactic acid or from lactide, preferably from lactide.

In the past few years, the general public has become increasingly apprehensive of the impact man-made waste has on the environment. Hence there is a growing interest in developing novel biodegradable (and preferably compostable) plastics from renewable resources.

One particularly interesting candidate for this task are poly(hydroxy carboxylic acid)s, in particular polylactic acid, now commercially available on a relatively large scale. The lactic acid is obtained from plants such as corn and rice or other sugar- or starch-producing plants. Not only is PLA obtainable from renewable materials, it is also easily compostable. For these reasons, there is significant interest in using PLA as a substitute in applications, where petroleum-based thermoplastics have conventionally been used.

Unfortunately, PLA used on its own does not have the same advantageous properties as conventional plastics do. In particular PLA has performance problems related to heat resistance, brittleness and limited flexibility, resulting in poor mechanical strength. On the other hand, polyolefins, in particular polypropylene, have much better mechanical properties. It has been attempted to combine these properties by blending PLA with polyolefins to obtain a resin that is at least partially biodegradable, but still has acceptable mechanical properties. However, up until now it was assumed that it would be difficult, even impossible, to obtain homogeneous PLA and polyolefin blends, due to the differences in polarity and molecular weight distribution. In the past, compatibilising agents were used. However, this requires an additional industrial step, as well as specific conditions during extrusion. Furthermore, undesirable by-products are created when adding compatibilising agents. Thus both the compatibilising agent and the by-products change the properties of the desired end product, be it a film, fibre or moulded object.

Using biodegradable poly(hydroxy carboxylic acid)s to disperse carbon nanotubes into polyolefins thus has the added benefit of providing a resin that is at least partially biodegradable and/or partially obtainable from renewable resources.

Thus, preferably the poly(hydroxy carboxylic acid) that is selected is biodegradable, for example polylactic acid. Biodegradability is herein defined as provided by the standard EN 13432:2000. In order for packaging material to be biodegradable it must have a lifecycle, which can be described as follows:
- a period of storage and/or use starting from time $t_0$, which is the moment the material comes off the production line;
- a period of disintegration starting at time $t_1$, during which the polymer begins to significantly chemically disintegrate e.g. via the hydrolysis of ester bonds;
- a period of biodegradation, during which the partly hydrolysed polymer biologically degrades as a result of the action of bacteria and micro organisms;

It is important to make the distinction between degradable, biodegradable and compostable as often these terms are used interchangeably. In addition to the above, a compostable plastic is "capable of undergoing biological decomposition in a compost site as part of an available program, such that the plastic is not visually distinguishable and breaks down to carbon dioxide, water, inorganic compounds, and biomass, at a rate consistent with known compostable materials (e.g. cellulose) and leaves no toxic residue" (ASTM). On the other hand a degradable plastic is one which is merely chemically changed i.e. there is no requirement for the plastic to be biologically degraded by microorganisms. Therefore, a degradable plastic is not necessarily biodegradable and a biodegradable plastic is not necessarily compostable (that is, it breaks down too slowly and/or leaves toxic residue).

In particular, the EN 13432:2000 standard for compostability has the following main features:
- Disintegration is measured by sieving the material to determine the biodegraded size. To be considered compostable, less than 10% of the material should be larger than 2 mm in size.
- Biodegradability is determined by measuring the amount of carbon dioxide produced over a certain time period by the biodegrading plastic. To be considered compostable, it must be 90% biodegraded within 90 days.
- Eco-toxicity is measured by determining whether the concentration of heavy metals is below the limits set by the standard and by testing plant growth by mixing the compost with soil in different concentrations and comparing it with controlled compost.

Composite Processing of Poly(Hydroxy Carboxylic Acid) and Nanotubes

The poly(hydroxy carboxylic acid) and the carbon nanotube are blended together to form a nanotube-polymer composite. This composite can then be used as a masterbatch to be added to a polyolefin and to introduce carbon nanotubes into the polyolefin composition more homogeneously than direct addition of the carbon nanotube to the polyolefin.

In particular, the Applicant has observed that blends of carbon nanotubes and poly(hydroxy carboxylic acid)s are surprisingly homogeneous. It appears that the polarity of the nanotubes is more similar to poly(hydroxy carboxylic acid)s than to polyolefins. Therefore, the carbon nanotube-poly(hydroxy carboxylic acid) composites are more homogeneous than if the carbon nanotube were blended directly into the polyolefin.

The method of composite processing i.e. blending is not particularly limited and can be carried out according to any known method in the art. One example of composite processing is solution processing whereby the nanotubes and the poly(hydroxy carboxylic acid) are mixed in a suitable solvent before evaporating said solvent to obtain the composite. Mixing can occur for example by magnetic stirring, shear mixing, refluxing, or ultrasonication. Another method that can be used to blend the nanotubes into the polymer is in situ polymerisation. In this case hydroxycarboxylic acids (or cyclic dimers and trimers thereof) are polymerised in the presence of either carbon nanotubes and catalyst, or carbon nanotubes acting as a catalytic support for the polymerisation catalyst. It is also possible to dry blend the nanotubes and the polymer. Dry blending can also be carried out prior to the melt processing stage.

However the preferred method for composite processing is melt processing. This technique takes advantage of the fact that thermoplastics soften when heated above their glass transition temperature (for polymers that are amorphous at room temperature) or above their melt temperature (for polymers that are semi-crystalline at room temperature). Melt processing is fast and simple and makes use of standard equipment of the thermoplastics industry. The components can be melt blended by shear mixing in a batch process such as in a Banbury or Brabender Mixer or in a continuous process, such as in an extruder e.g. a twin screw extruder. During melt blending, the temperature in the blender will generally be in the range between the highest melting point of poly(hydroxy carboxylic acid) employed and up to about 150° C. above such melting point, preferably between such melting point and up to 100° C. above such melting point.

The time required for the blending can vary broadly and depends on the method of blending employed. The time required is the time sufficient to thoroughly mix the components. Generally, the individual polymers are blended for a time of about 10 seconds to about 60 minutes, preferably to about 45 minutes, more preferably to about 30 minutes.

The proportion of carbon nanotubes added to a given quantity of poly(hydroxy carboxylic acid) is not particularly limited. The carbon nanotubes are present at up to 99 wt % of the composites, preferably up to 75 wt %, more preferably up to 50 wt %, even more preferably up to 25 wt %, more preferably than that up to 20 wt %. It is most preferred that at most 5 wt % of nanotubes are added. A very small quantity of nanotubes is capable of beneficially affecting the properties of a polymer, such that very small quantities can be used, depending on the intended use of the polymer. However, for most applications it is preferred that 0.1 wt % of nanotubes or greater is added.

The proportion of poly(hydroxy carboxylic acid) is not particularly limited. It can range from 1 to 99 wt % of the total composite. Preferably, the composite comprises at least 25 wt % of the poly(hydroxy carboxylic acid), more preferably at least 50 wt %, even more preferably at least 75 wt % and more preferably than that at least 80 wt % of the poly(hydroxy carboxylic acid). Most preferably, the composite comprises at least 95 wt % of the poly(hydroxy carboxylic acid).

Any other additive can be included in the composite masterbatch. Thus additives such as pigments, carbon black, anti-oxidants, UV-protectors, lubricants, anti-acid compounds, peroxides, grafting agents and nucleating agents can be included. However, they may alternatively be added whilst blending the nanotube composite masterbatch with the polyolefin or they be added to the polyolefin prior to its blending with the nanotube composite.

The Polyolefin

Once the nanotube composite masterbatch has been prepared, it can be blended into a resin comprising one or more polyolefins without the need of any compatibilisers.

The polyolefin can be any polymer of α-olefins. The term "polyolefin" herein includes homo- and copolymers of α-olefins. The α-olefin is any 1-alkylene comprising from 2 to 12 carbon atoms, for example, ethylene, propylene, 1-butene, 1-pentene and 1-hexene. When the polyolefin is a polymer of an olefin having 3 or more carbon atoms, such as polypropylene, the polyolefin may be atactic, isotactic or syndiotactic.

If the polyolefin is a copolymer, the comonomer can be any α-olefin i.e. any 1-alkylene comprising from 2 to 12 carbon atoms, but different from the main monomer. In certain cases, the comonomer can also be any functionalised compound that comprises a vinyl group. These kind of vinyl-containing comonomers comprise from 2 to 12 carbon atoms and include, for example, vinyl acetate, acrylic acids and acrylates. The copolymer can be an alternating, periodic, random, statistical or block copolymer.

The term polyolefin herein also includes blends of two or more polyolefins as defined above.

Preferably, the polyolefin used in the resin composition of the invention is a homo- or copolymer of ethylene or propylene.

The α-olefins can be polymerised either at high pressure or at low pressure. When polymerising at high pressure, in particular ethylene, no catalyst is required as the polymerisation occurs via a radical mechanism. The polymerisation of ethylene at high pressure can be initiated using an initiator, for example, a peroxide. Ethylene polymerised at high pressure is known as low density polyethylene (LDPE). It has a density of between 0.910 and 0.940 g/cm$^3$ due to the presence of a high degree of long and short chain branching. It has unique flow properties, allowing it to be easily processed. However, the crystal structure of LDPE is not packed very tightly and the inter- and intramolecular forces are weak. Therefore, mechanical properties such as tensile strength, environmental stress crack resistance (ESCR) and tear resistance are particularly low in LDPE. However by blending LDPE with carbon nanotube-containing poly(hydroxy carboxylic acid)s, the mechanical properties of LDPE are greatly improved, without losing any of its processing advantages.

Preferably the ethylene is polymerised at high pressure with a comonomer, wherein the comonomer is one of the vinyl-containing compounds described above, for example, vinyl acetate, acrylic acids and acrylates. These comonomers impart on the LDPE polar properties. Thus the LDPE copolymer is more compatible with the poly(hydroxy carboxylic acid)-nanotube composite and the two components can be easily mixed to form a homogeneous blend. No compatibiliser is required for this purpose. Most preferably, the copolymer is a ethylene-vinyl acetate polymer, the comonomer being vinyl acetate.

The relative amount of comonomer in the high pressure ethylene copolymer is not particularly limited. Preferably, the comonomer content of high pressure ethylene copolymers does not exceed 30 wt % of the ethylene copolymer. More preferably it does exceed 20 wt % and most preferably it is at most 10 wt %.

Alternatively, any type of low-pressure polymerised polyolefin, catalysed by any known appropriate means in the art, can be used in the resin composition according to the invention. Examples of suitable catalysts include single site catalysts (in particular metallocene catalysts), Ziegler-Natta catalysts, and chromium catalysts. If required, more than one catalyst of the same or different type can be used, either simultaneously in one reactor, in two parallel reactors or in two reactors connected to each other in series, to obtain multimodal or broader molecular weight distributions.

Examples of suitable catalysts for polymerising ethylene, in particular, include single site catalysts (in particular metallocene catalysts), Ziegler-Natta catalysts, and chromium catalysts. However any other catalyst known in the art can be used too. Low-pressure polymerised ethylene is more linear than LDPE, having low concentrations of long chain branching, giving it stronger intermolecular forces and higher tensile strength than LDPE. Low-pressure polymerised ethylene can be broadly categorised as linear low density (LLDPE), medium density (MDPE) and high density (HDPE) polyethylene, the density being mainly regulated by the relative amount of comonomer added; the more comonomer added, the higher the degree of short chain branching and the lower the density. Preferably, the comonomer is polypropylene, 1-butene, 1-pentene or 1-hexene.

Examples of suitable catalysts for polymerising propylene include Ziegler-Natta and single site catalysts (in particular metallocene catalysts). However any other catalyst known in the art can be used too. The polypropylene can be syndiotactic, isotactic or atactic. Isotactic polypropylenes can be obtained using Ziegler-Natta catalysts or appropriate single site catalysts (in particular metallocene catalysts). Syndiotactic and atactic polypropylenes are obtainable using appropriate single site catalysts (in particular metallocene catalysts). Isotactic polypropylene is generally selected.

The overall properties of the polyolefin are dependent on the method and type of catalyst used. Single-site catalysed polyolefins, in particular metallocene-catalysed polyolefins, are the preferred polyolefins for the purposes of this invention. It has been found that poly(hydroxy carboxylic acid)s are more miscible with single-site catalysed polyolefins, in particular metallocene-catalysed polyolefins, than those blended with Ziegler-Natta or chromium catalysed polyolefins. Blends of single-site catalysed polyolefins, in particular metallocene-catalysed polyolefins, with poly(hydroxy carboxylic acid)s are homogeneous and do not require any compatibilisation.

Compared to non-metallocene catalysed polyolefins, single-site catalysed polyolefins, in particular metallocene-catalysed polyolefins, have a much narrower molecular weight distribution. Preferably, the molecular weight distribution is of from 1 to 10, preferably from 1 to 7, more preferably from 1 to 5, most preferably from 1 to 4. The narrow molecular weight distribution is compatible with the similarly narrow molecular weight distribution of poly(hydroxy carboxylic acid)s.

Without wishing to be bound by theory, it is thought that the molecular structure of single-site catalysed polyolefins, in particular metallocene-catalysed polyolefins, induces a better compatibility with poly(hydroxy carboxylic acid)s as well. These polyolefins show no or very little long chain branching. The incorporation of comonomers occurs very regularly along the polyolefin backbone resulting in a highly uniform distribution of comonomers i.e. regular short chain branching. This effect (known as very narrow short chain branching distributions (SCBD)) in polyolefins is specific to single-site catalysed polyolefins, in particular metallocene-catalysed polyolefins. As a result, during the crystallization from the melt, very small crystallites are formed throughout the material, thus providing excellent optical clarity. Ziegler-Natta and chromium-catalysed polyolefins on the other hand, have a poor and very random comonomer incorporation, therefore during crystallisation a broad distribution of different sizes of crystallites occurs, resulting in high haze values.

The Applicant believes, without wishing to be bound by theory, that since the molecular architecture of poly(hydroxy carboxylic acid)s is similar to that of single site catalysts (in particular metallocene catalysts), i.e. narrow molecular weight distribution, no long chain branching and narrow short chain branching distributions (if short chains are present at all), poly(hydroxy carboxylic acid)s are therefore more compatible with single-site catalysed polyolefins, in particular metallocene-catalysed polyolefins, than with other polyolefins.

The polyolefin resin may also contain additives such as pigments, carbon black, anti-oxidants, UV-protectors, lubricants, anti-acid compounds, peroxides, grafting agents and nucleating agents can already be included. However, they may alternatively be added to the nanotube composite masterbatch prior to blending with the polyolefin. They may also be added during blending of the two components of the resin composition according to the invention.

Blending of the Nanotube-Polymer Composite Masterbatch with the Polyolefin.

The blending of the nanotube-poly(hydroxy carboxylic acid) composite with the polyolefin can be carried out according to any physical blending method known in the art. This can be, for instance, wet blending or melt blending. The blending conditions depend upon the blending technique and polyolefin involved. Depending on the method, the polyolefin and the nanotube composite can be in any appropriate form, for example, fluff, powder, granulate, pellet, solution, slurry, and/or emulsion.

If dry blending of the polymer is employed, the dry blending conditions may include temperatures from room temperature up to just under the melting temperature of the polymer, and blending times in the range of a few seconds to hours. The components are dry blended prior to melt blending.

Melt processing is fast and simple and makes use of standard equipment of the thermoplastics industry. The components can be melt blended in a batch process such as with a Banbury or Brabender Mixer or in a continuous process, such as with a typical extruder e.g. a twin screw extruder. During melt blending, the temperature at which the polymers are combined in the blender will generally be in the range between the highest melting point of the polymers employed and up to about 150° C. above such melting point, preferably between such melting point and up to 100° C. above such melting point. The time required for the melt blending can vary broadly and depends on the method of blending employed. The time required is the time sufficient to thoroughly mix the components. Generally, the individual polymers are blended for a time of about 10 seconds to about 60 minutes, preferably to about 45 minutes, more preferably to about 30 minutes.

The components can also be wet blended whereby at least one of the components is in solution or slurry form. If solution blending methods are employed, the blending temperature will generally be 25° C. to 50° C. above the cloud point of the solution involved. The solvent or diluent is then removed by evaporation to leave behind a homogeneous blend of poly (hydroxy carboxylic acid) and polyolefin with carbon nanotubes dispersed throughout the mixture.

The resin composition comprises from 1 to 50 wt % of the carbon nanotube-poly(hydroxy carboxylic acid) composite, preferably from 1 to 40 wt %, more preferably from 1 to 30 wt % and most preferably from 1 to 20 wt %. The resin composition comprises from 1 to 99 wt % of the polyolefin, preferably from 25 to 99 wt %, more preferably from 50 to 99 wt %, even more preferably from 75 to 99 wt % and most preferably from 80 to 99 wt %.

Preferably, carbon nanotubes make up at least 0.05 wt % of the total resin composition. Preferably, the carbon nanotube content of the total resin composition does not exceed 10 wt %, more preferably it does exceed 5 wt % and most preferably it does exceed 3 wt %.

Preferably, the resin composition essentially consists of a polyolefin, carbon nanotubes and poly(hydroxy carboxylic acid).

Due to the improved mechanical properties of the polyolefin in the resin composition, and also the improved electrical and thermal conductivity, as well as partial biodegradability of the resin composition, it is suitable for a wide variety of applications.

The improved mechanical properties make the resin composition suitable for fibre applications. The fibres of the invention have higher stiffness, increased tensile strength, higher tenacity, better energy absorption capabilities and very good strain at break. Hydrophilicity of the polyolefin-containing fibre is also increased due to the presence of the polar poly(hydroxy carboxylic acid) component. The fibres can be produced on an industrial scale as multi-filament yarns, but still having the advantageous properties of the monofilament. Examples of articles made from the fibre comprising the resin composition of the invention are ropes, nets and cables. The light fibres having improved mechanical strength can also be used in anti-ballistic composites to make light protective clothing.

The resin composition can also be transformed into a film with improved printability, better surface tension, increased thermal and high frequency sealability, improved stiffness and enhanced breathability. The film also has good barrier properties against atmospheric gases, in particular oxygen and nitrogen. The resin composition can also be used to manufacture pouches, for example, for medical applications.

The composition is also suitable for typical injection, extrusion and stretch blow moulding applications, but also thermoforming, foaming and rotomoulding. The articles made according to these processes can be mono- or multi-layer, at least one of the layers comprising the resin composition of the invention.

The resin can also be used in applications that require dissipation of static electricity e.g. electrically dissipative parts for automotive applications, conductive video disks, conductive textiles, stand shields for wires and cables, cable jacketing, hospital tiles, computer tapes or mine belting. With a higher content of nanotubes in the resin, electrical conductivity is further enhanced and allows for other applications such as, for instance, parts that can be electrostatically painted for the automotive industry.

The resins also exhibits a flame retardant effect as measured by thermogravimetric analysis (TGA) and cone calorimetry tests. This effect is more pronounced when nanotubes are used in combination with classical flame retardants, such as ATH (aluminium trihydrate) and magnesium hydroxide, due to the presence of synergistic effects between both compounds.

EXAMPLES

Example A

Metallocene-catalysed polypropylene (MR2001 from Total Petrochemicals®) having MFR of 25 dg/min is extruded in a Haake® Minilab twin-screw extruder. Temperature is set at 200° C. and the resin is recirculated for 2 minutes before extrusion. Fibres from the obtained material are then drawn using a Ceast® laboratory equipment. Mechanical tests are carried out on the material.

Example B

Metallocene-catalysed polypropylene (MR2001 from Total Petrochemicals®) having MFR of 25 dg/min is mixed with carbon nanotubes (Graphistrength C100 from Arkema®) in a Haake® Minilab twin-screw extruder. Temperature is set at 200° C. and the mixture is recirculated for 2 minutes before extrusion. Fibres from the obtained material are then drawn using a Ceast® laboratory equipment. Mechanical properties are improved as compared to Example A.

Example C

According to the Invention

PLA from Unitika is mixed with carbon nanotubes (Graphistrength C100 from Arkema®) in a Haake® Minilab twin-screw extruder. Temperature is set at 200° C. and the mixture is recirculated for 2 minutes before extrusion. The extrudate is then blended with metallocene-catalysed polypropylene (MR2001 from Total Petrochemicals') using the same equipment and a temperature of 200° C. Fibres from the obtained material are then drawn using a Ceast® laboratory equipment. Mechanical properties are further improved as compared to Example B.

The invention claimed is:

1. An article comprising a composite, wherein the article further comprises a polyolefin blended with the composite, and wherein the composite is formed by a process comprising blending a poly(hydroxy carboxylic acid) with carbon nanotubes to form the composite, wherein the blending of the poly(hydroxy carboxylic acid) with the carbon nanotubes comprises solution processing, dry blending, dry blending and melt blending, or melt blending.

2. The article of claim 1, wherein the article is a fiber or a film.

3. The article of claim 1, wherein the article is an injection molded article, an extrusion molded article, or a stretch blow molded article.

4. The article of claim 1, wherein the poly(hydroxy carboxylic acid) is polylactic acid.

5. The article of claim 1, wherein the poly(hydroxy carboxylic acid) is melt blended with the carbon nanotubes.

6. The article of claim 1, wherein the carbon nanotubes are dispersed in a matrix of the poly(hydroxy carboxylic acid).

7. The article of claim 1, wherein:
the carbon nanotubes are single walled carbon nanotubes having:
a diameter of at least 0.5 nanometers and at most 50 nanometers;
a length of at least 1 microns and at most 5 centimeters; and
a length/diameter aspect ratio of at least 100; or
the carbon nanotubes are multi-walled carbon nanotubes having:
a diameter of at least 2 nanometers and at most 100 nanometers;
a length of at least 1 micron and at most 100 microns; and
a length/diameter aspect ratio of at least 100.

8. The article of claim 1, wherein the carbon nanotubes are non-functionalized carbon nanotubes.

9. An article comprising a composite, wherein the article further comprises a polyolefin blended with the composite, wherein the composite is formed by a process comprising:
polymerizing hydroxy carboxylic acid monomers to form poly(hydroxy carboxylic acid); and
blending the poly(hydroxy carboxylic acid) with carbon nanotubes to form the composite having the carbon nanotubes dispersed within the poly(hydroxy carboxylic acid).

10. The article of claim 9, wherein the article is a fiber or a film.

11. The article of claim 9, wherein the article is an injection molded article, an extrusion molded article, or a stretch blow molded article.

12. The article of claim 9, wherein the blending of the poly(hydroxy carboxylic acid) with the carbon nanotubes comprises solution processing, dry blending, dry blending and melt blending, or melt blending.

13. The article of claim 9, wherein the poly(hydroxy carboxylic acid) is polylactic acid.

14. The article of claim 9, wherein the carbon nanotubes are non-functionalised carbon nanotubes.

* * * * *